US007289019B1

(12) United States Patent
Kertes

(10) Patent No.: US 7,289,019 B1
(45) Date of Patent: Oct. 30, 2007

(54) VEHICLE AVOIDANCE COLLISION SYSTEM

(76) Inventor: Jon Kertes, 10970 Amery Ave., South Gate, CA (US) 90280

( * ) Notice: Subject to any disclaimer, the term of this patent is extended or adjusted under 35 U.S.C. 154(b) by 197 days.

(21) Appl. No.: 11/127,888

(22) Filed: May 12, 2005

Related U.S. Application Data

(60) Provisional application No. 60/570,183, filed on May 13, 2004.

(51) Int. Cl.
  *B60Q 1/00* (2006.01)
(52) U.S. Cl. ............... 340/435; 340/943; 340/461; 342/357.06; 342/70; 701/36; 701/205
(58) Field of Classification Search ........... 340/435, 340/903, 902, 901, 436, 904, 943, 461; 342/70, 342/61, 357.06, 357.01; 701/200, 213, 36, 701/1, 23, 27, 205
See application file for complete search history.

(56) References Cited

U.S. PATENT DOCUMENTS

| 4,626,850 | A | 12/1986 | Chey |
| 5,235,316 | A | 8/1993 | Qualizza |
| 5,892,855 | A * | 4/1999 | Kakinami et al. .......... 382/291 |
| 6,087,928 | A * | 7/2000 | Kleinberg et al. .......... 340/436 |
| 6,097,285 | A * | 8/2000 | Curtin ....................... 340/436 |
| 6,184,821 | B1 * | 2/2001 | Hrovat et al. .......... 342/357.08 |
| 6,211,778 | B1 * | 4/2001 | Reeves ....................... 340/436 |
| 6,285,778 | B1 * | 9/2001 | Nakajima et al. ........... 382/104 |
| 6,542,809 | B2 * | 4/2003 | Hehls, III ................... 701/120 |
| 6,606,033 | B1 * | 8/2003 | Crocker et al. ............. 340/901 |
| 6,794,987 | B2 * | 9/2004 | Schiffmann et al. ........ 340/435 |
| 6,795,014 | B2 | 9/2004 | Cheong |
| 6,914,521 | B2 * | 7/2005 | Rothkop .................. 340/425.5 |

* cited by examiner

*Primary Examiner*—Benjamin C. Lee
*Assistant Examiner*—Daniel Previl
(74) *Attorney, Agent, or Firm*—Harpman & Harpman

(57) ABSTRACT

An onboard vehicle safety detection and warning system that provides real time detection and analysis of surrounding vehicles for the driver on a central view screen. Multiple vehicle detection devices are mounted on the vehicle to provide an electronic detection tracking and recording capabilities advising the driver of potential accidents with visual and audio instructions for avoidance.

6 Claims, 4 Drawing Sheets

VEHICLE AVOIDANCE COLLISION SYSTEM

This application claims benefit of 60/570,183 filed May 13, 2004

BACKGROUND OF THE INVENTION

1. Technical Field

The present invention is directed to vehicle detection and warning systems for vehicles that will aid the driver in taking evasive action to prevent accidents. The present invention will be helpful to drivers by providing additional information about traffic conditions and other potential accident related situations in all environmental conditions which may diminish visual acuity of the driver.

2. Description of Prior Art

Prior art devices of this type have relied on a variety of different systems; see for example U.S. Pat. Nos. 4,626,850, 5,235,316, 5,892,855, 6,285,778 and 6,790,014.

In U.S. Pat. No. 4,626,850 a vehicle detection and collision avoidance apparatus is disclosed which utilizes an acoustical ranging device to determine the relative position of vehicles in relation to the control vehicle.

In U.S. Pat. No. 5,235,316 is directed to a vehicle collision avoidance system which utilizes a rotatable mirror and an ultrasonic transmitter receiving unit positioned to scan a pre-determined area about the vehicle to detect the present of an object and to calculate the distance from the vehicle and then to provide a warning threat to the occupant of the control vehicle.

U.S. Pat. No. 5,892,855 claims an apparatus for detecting an object located ahead of a vehicle using a plurality of cameras with different fields of view. This device provides multiple camera configurations which are interlinked to provide overlapping vehicle configurations for curving road applications for tracking vehicles ahead of the vehicle in which the device is located.

U.S. Pat. No. 6,285,778 is directed towards a vehicle surrounding monitor with obstacle avoidance lighting which utilizes a laser configuration to determine a projected pattern light spot matrix and record same with a camera to determine through data processing the relative position in relation to the transmitter.

U.S. Pat. No. 6,795,014 illustrates a method and apparatus for detecting a vehicle distance in which reflective waves of radar beams scanned at a scanning angle is adjusted based on lane markers extracted from road image obtained by a camera. This device is used to determine the relative position of the vehicle in which the equipment is positioned for guidance and tracking along an irregular road path and to detect objects such as the side of the road associated therewith.

SUMMARY OF THE INVENTION

A self contained safety alert system which will provide a driver a view of surrounding vehicle positions relative to their own vehicle. The integrated system combines a number of vehicle tracking sensors with electronic imagery cameras to create an integrated visual status and warning display for the driver using computer generated graphics and situation analysis with associated problem solving software.

DESCRIPTION OF THE PREFERRED EMBODIMENT

Figure 1:
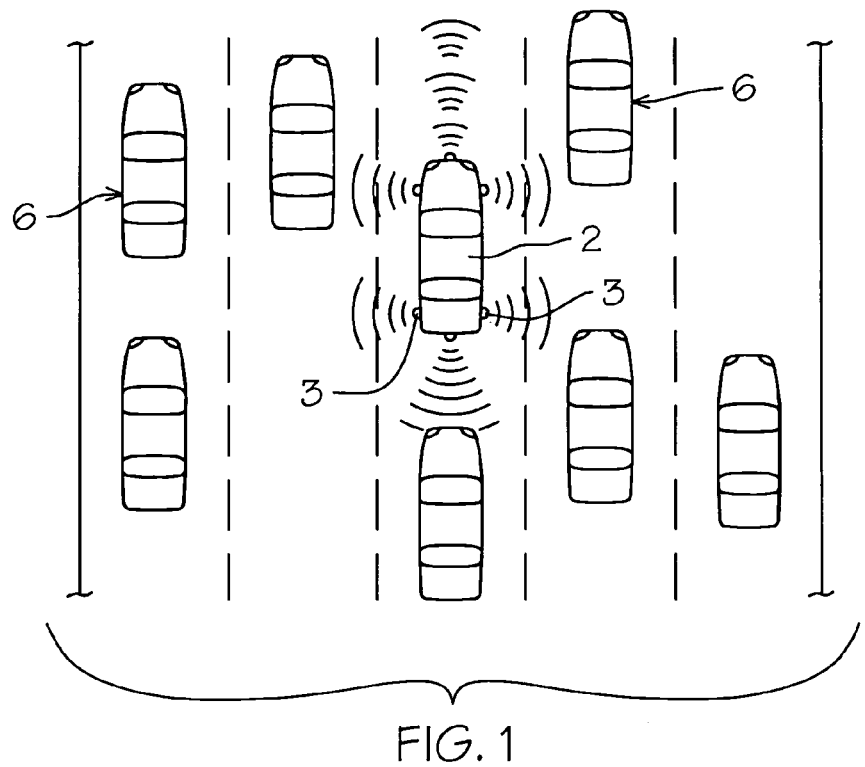
FIG. 1 is a graphic display of vehicles.

Referring to FIGS. 1-4 of the drawings, a vehicle safety system of the invention can be seen for use with a driver's vehicle 2. The safety system has a plurality of detection sensors 3 positioned on the vehicle 2 to provide an electronic detection perimeter thereabout as seen in FIG. 1 of the drawings.

The detection sensors 3 are preferably radar units utilizing Doppler radar capability to locate and plot the target vehicle's 6 range and relative velocity. It will be noted that the detection sensor 3 radar units for this example have an effective detection range of up to 350 feet with an accuracy level of + or − three feet with a given beam band width of twelve degrees of a typical 5 mW monopulse radiation type.

Some of the detection sensors 3 are directionally adjustable for improved view.

Figure 2:
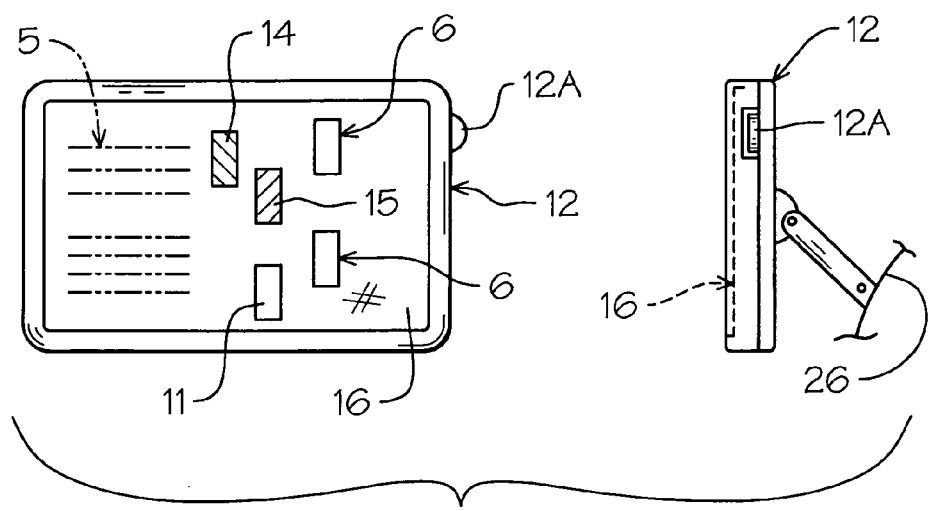
FIG. 2 illustrates the display screen in warning situation.
Figure 3:
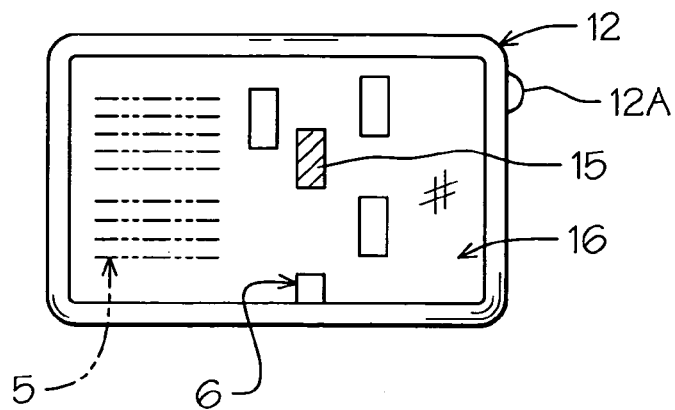
FIG. 3 illustrates the display screen in a collision condition.
Figure 5:
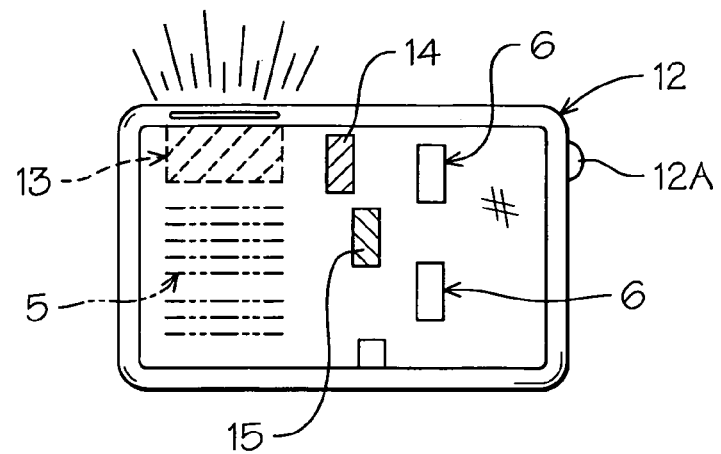
FIG. 5 illustrates the display screen in a collision condition.

Referring to FIGS. 2, 3 and 5 of the drawings, a display screen 12 having a dimmer control 12A with color graphic display 16 is illustrated showing a variety of driver alert situations in which information text 5 is also displayed identifying the problem and appropriate avoidance action to be taken.

Vehicle icons 6 are generated on the display screen 12 to show the relative position and their potential threat level by colorization at 14. In this example, chosen for illustration, uncolored vehicle icons 11 indicate no threat while amber indicates warning changing to red at 14 indicates immediate collision with the driver's vehicle 2 which is shown as green at 15, as seen in FIGS. 2 and 3 of the drawings.

A voice synthesizer 13/21 is integrated into the system to provide an inaudible alert and accident avoidance directions to the driver in responding to the detected threat along with display text 5 as hereinbefore described.

Figure 4:
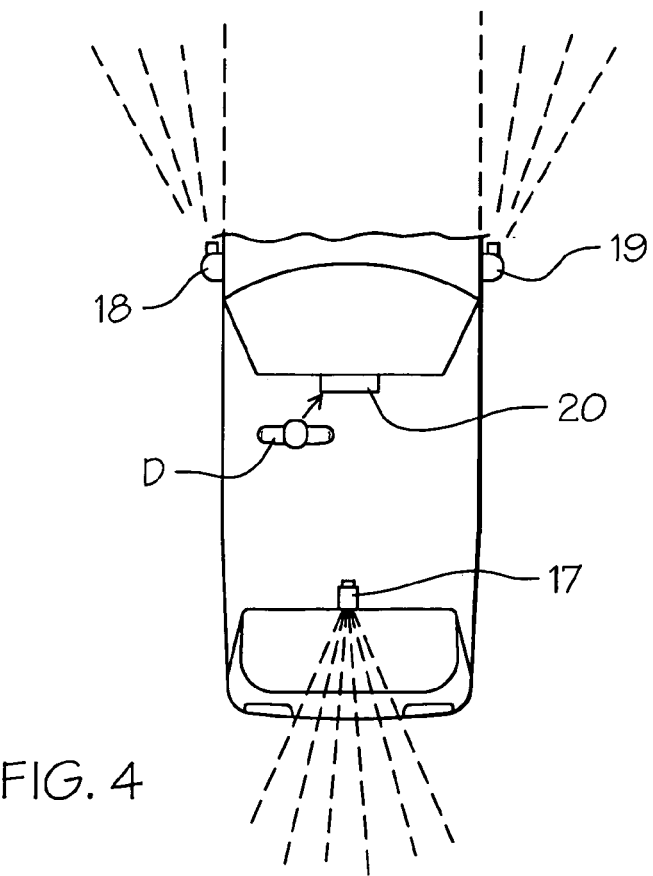
FIG. 4 is a graphic representation of the driver's vehicle and associated video cameras.

Referring now to FIG. 4 of the drawings, multiple electronic imagery cameras 17, 18 and 19 are positioned on the driver's vehicle 2 and are activated and controlled by an integrated control computer (CPU 41) as illustrated in block flow diagram in FIG. 7 of the drawings as will be disclosed in greater detail hereinafter.

Figure 6:
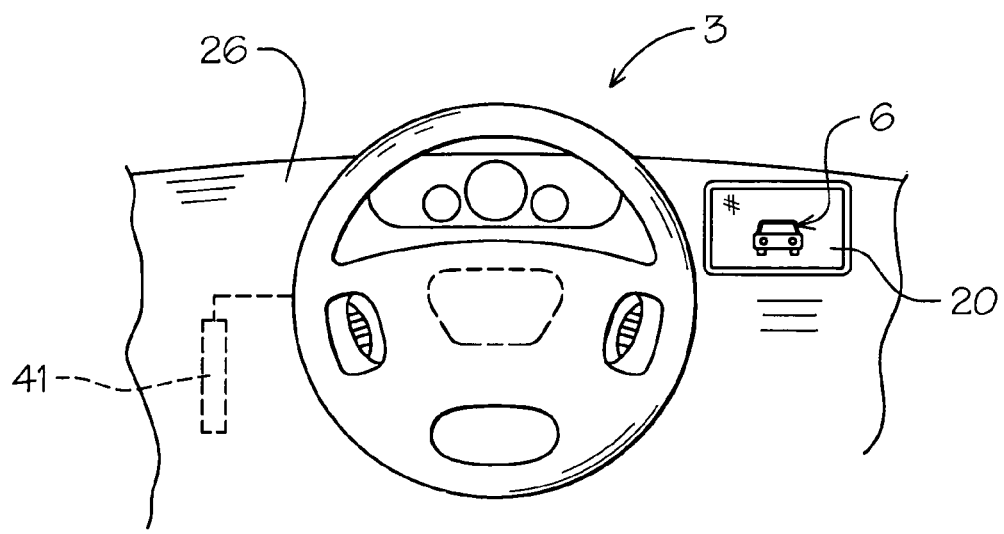
FIG. 6 is a graphic representation of the driver's vehicle in component orientation therein.

Video cameras 18 and 19 provide respective driver side and passenger side lane views as well as front quadrant views while the video camera 17 imparts a rear view to the driver D via a color display screen 20 mounted on the dash 26 of the user vehicle as best seen in FIG. 6 of the drawings.

The camera images as generated are also stored continuously on a rewriteable electronic memory always recording and saving the effective last 256 megabytes of images for later review if required.

Figure 7:
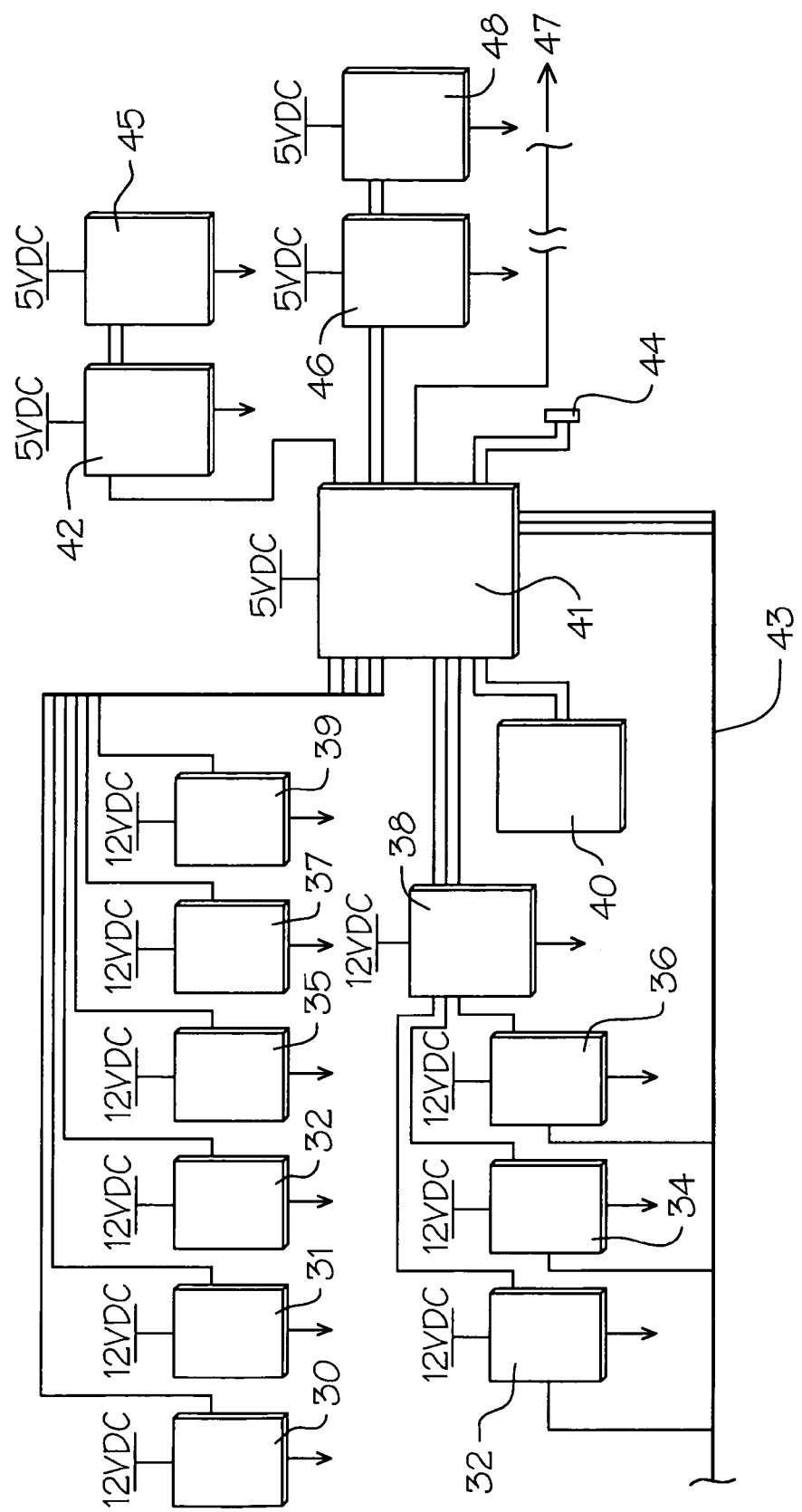
FIG. 7 is graphic block flow circuit diagram of the safety alert system.

Referring now to FIG. 7 of the drawings, computer controller 41 of the vehicle alert and avoidance system is illustrated having multiple radar units of the system indicated in the block flow diagram at 30-39 and video cameras 32, 34 and 36 via control lines 43 interconnected thereto with associated 12V DC power supply.

An analog to digital converter 38 interconnects the cameras 32, 34 and 36 with the control computer 41 for proper signal processing.

The driver display 46 and color LC display 48 are internally connected to this control computer 41 as well as the voice synthesizer and audio alarm speech indicator 45 with its own digital to analog converter 42 as will be well known and understood within the art.

An eighty GB automotive hardened hard drive 40 is provided as well as a USB memory stick port 44 for downloading images, if require, the control computer 41 is interconnected to the vehicle's engine control computer 47 as will be well understood by those skilled in the art.

It will be evident from the above description that the critical feature of this invention is that it can track all movement associated with vehicles in its range as well as the driver's vehicle which provides both real-time video imaging or electronically generated radar associated type detection and will record and store it on its onboard memory for review, as required.

Additionally, sensors can be utilized within the system to provide a record of the equipped vehicle's acceleration and deceleration as well as directional orientation, recording this information which will establish a pattern and record along with the associated vehicles in its perception range for review in the cause of an accident, for example, thus eliminating the inaccuracy of eye witness accounts and providing a unique electronic record of the accident for investigators to determine cause, effect and liability.

This information could also be used to establish individual's driving habits and thus be able to determine by analysis whether drivers are driving in a reckless manner which may occur through bad judgment or impaired senses such as the use of alcohol or drugs.

It will thus be seen that a new and novel vehicle safety and detection and warning system has been illustrated and described herein and that various changes and modification may be made thereto without departing from the spirit of the invention.

Therefore I claim:

1. A proactive electronic vehicle detection system for collision assessment on a vehicle comprises,
    a plurality of vehicle tracking sensors positioned on a control vehicle,
    said tracking sensors transmitting and receiving return electronic signals upon detecting of an object within their path,
    computer analysis means in communication with said tracking sensors,
    a display screen within said control vehicle integrated with said computer means to display computer generated multiple interchangeable color graphic vehicle representations of detected vehicles,
    multiple video cameras on said control vehicle producing video images of areas around said control vehicle corresponding to some of said tracking sensor paths and means for electronically storing said video representation and graphic vehicle images and means for generating an audio and text warning corresponding to said graphic vehicle representation.

2. The proactive vehicle detection system for collision assessment set forth in claim 1 wherein said tracking system sensors are of a Doppler radar configuration.

3. The proactive vehicle detection system for collision assessment set forth in claim 1 wherein said computer analysis means and means for generating an audio and text warning-corresponding to said graphic vehicle and video representations comprises,
    a central processing unit within a computer configuration having a human voice synthesizer integrated therein for generating audible warnings and collision avoidance messages in response to tracking sensor information analysis based on a pre-determined set of collision avoidance criteria.

4. The proactive vehicle detection system for collision assessment on a vehicle set forth in claim 3 wherein said central processing unit has information, retainment and storage access ports for a portable self-contained memory recording modules.

5. The proactive vehicle detection system for collision assessment on a vehicle set forth in claim 1 wherein said video cameras are positioned to visually confirm in real-time road areas adjacent to and behind said control vehicle.

6. The proactive vehicle detection system for collision assessment on a vehicle set forth in claim 1 wherein said means for electronically storing said video images comprises,
    an internal electronic hard drive having a known data storage capacity for recording and playing back the imported and stored data.

* * * * *